(12) United States Patent
Kondrat et al.

(10) Patent No.: US 7,706,255 B1
(45) Date of Patent: Apr. 27, 2010

(54) COMMUNICATIONS APPARATUS WITH REDUNDANT SWITCHING OR BACKPRESSURE MECHANISM

(75) Inventors: Paul Kondrat, Ottawa (CA); Jonathan Bosloy, Kanata (CA)

(73) Assignee: Solace Systems, Inc., Ottawa, ON (CA)

( * ) Notice: Subject to any disclaimer, the term of this patent is extended or adjusted under 35 U.S.C. 154(b) by 512 days.

(21) Appl. No.: 11/668,309

(22) Filed: Jan. 29, 2007

(51) Int. Cl.
*H04J 1/16* (2006.01)
(52) U.S. Cl. ........................... 370/219; 370/394
(58) Field of Classification Search ......... 370/216–224, 370/392, 394, 229–236.1, 395.4, 351, 389
See application file for complete search history.

(56) References Cited

U.S. PATENT DOCUMENTS

| | | | |
|---|---|---|---|
| 6,675,254 B1 * | 1/2004 | Wachel | 710/316 |
| 6,765,869 B2 * | 7/2004 | Chintada et al. | 370/230 |
| 7,426,185 B1 * | 9/2008 | Musacchio et al. | 370/235.1 |
| 2002/0191594 A1 * | 12/2002 | Itoh et al. | 370/352 |
| 2003/0169688 A1 * | 9/2003 | Mott | 370/230 |
| 2004/0223452 A1 * | 11/2004 | Santos et al. | 370/229 |
| 2005/0083833 A1 * | 4/2005 | Gettala et al. | 370/219 |
| 2005/0117562 A1 * | 6/2005 | Wrenn | 370/351 |
| 2005/0122957 A1 * | 6/2005 | Ambe | 370/351 |

\* cited by examiner

*Primary Examiner*—Kwang B Yao
*Assistant Examiner*—Obaidul Huq
(74) *Attorney, Agent, or Firm*—Marks & Clark; Richard J. Mitchell

(57) ABSTRACT

A communications apparatus includes several functional modules for implementing an application, a pair of switch modules to provide redundant switching capability for transferring frames between the functional modules. Each functional module is connected to each switch module by a frame-based communication link. A redundancy logic unit at each functional module inserts sequence numbers into outgoing frames, replicates the outgoing frames for forwarding to each of said switch modules, and monitors incoming frames from each of the switch modules to select frames for forwarding to an application based on the sequence numbers. In this way, redundancy is maintained at all times, while duplicate frames are eliminated at the receiving module.

22 Claims, 4 Drawing Sheets

506
Source MAC Address Format

507
Destination MAC Address Format

COMMUNICATIONS APPARATUS WITH REDUNDANT SWITCHING OR BACKPRESSURE MECHANISM

FIELD OF THE INVENTION

This invention relates to data communication networks and in particular to a communications apparatus with redundant switching or backpressure mechanism.

BACKGROUND OF THE INVENTION

In the field of data communications there are many examples of chassis based communication devices. A chassis based communication device features a series of modular components; typically a chassis (or enclosure), a backplane and a series of add-in circuit cards. Together chassis and backplane typically provide a series of slots into which the add-in cards can be installed. The backplane provides a series of connections between slots to allow communication between cards in different slots. The topology of the connections on the backplane varies from system to system. One common topology is referred to as a dual star. In the dual star topology, the backplane provides two links to each slot of the backplane. Each link terminates on one of two dedicated slots in the system. These slots are commonly referred to as switch or hub slots. This configuration is referred to as a dual star because there are two stars of links each centered by a switch card. The two switch cards are provided for redundancy. As an example, such a system has been standardized by the PCI Industrial Computer Manufacturers Group (PICMG) as the PCIMG 3.0 standard, the contents of which are included by reference.

The switch slots are so called because they typically contain a series of components that logically connect the other slots in the system for the purpose of slot to slot communications, known as a switch fabric. The switch fabric may also contain components that reside on cards other than the switch card; these components are commonly known as the fabric interface. In currently existing systems the switch fabric components are typically purpose built application specific integrated circuits (ASICs) or application specific standard products (ASSPs) as they are known in the art. An emerging trend is the application of standard networking technologies to the switch fabric function; technologies such as Ethernet, Infiniband or Fibre Channel but may include others. Designing a system that incorporates these technologies is desirable because they present standard interfaces to other system components; this allows for other components to be sourced from multiple vendors. Standard networking technologies also have the advantage of low cost, primarily because they are heavily mass produced. However, the advantages that these technologies enjoy compared to the purpose built switch fabrics (in the embedded data communications application) are in many cases out weighed by a lack of features; such as redundancy and switch congestion management.

Chassis based communication devices typically fall into a category of devices know as high availability systems. High availability systems are often required to be operational 99.999% of the time. In order to achieve these stringent requirements for system availability products built to these standards must feature redundancy for all components as well as the ability to repair the system without taking it offline. The switch card of a chassis based multi card communication device is an example of such a component; as such redundancy is required. Purpose built switch fabric chipsets typically support redundancy as a feature. Redundancy is typically supported by a combination of the switch fabric components residing on the switch cards as well as the fabric interface components that reside on the other cards of the system.

Methods of providing switch redundancy of similar systems using an Ethernet fabric are described in U.S. Pat. No. 6,675,254 herein included by reference; here a method of providing redundancy by replicating frames and transporting them over parallel Ethernet switches is described. Previous methods lack a simple way for the destination to determine on a frame by frame basis which copy of each frame to receive. Higher layer protocols such as TCP employ sequence numbers to make them resilient to the reception of duplicate frames but, removing the duplicates by these methods would unnecessarily burden the application terminating TCP; a simple algorithm suitable to implementation in hardware that is able to remove the duplicate frames before they are transferred to the application is desirable.

A purpose built switch fabric for a chassis based communication device will typically implement one or more method(s) of avoiding congestion as a feature. These methods are designed to minimize the amount of data loss within the switch fabric (ideally to 0) while maximizing throughput. These methods also typically provide for some level of quality of service to prevent head of line blocking, as is known in the art, where congestion of low priority traffic impacts the performance of higher priority traffic. Standard networking technologies are less advanced with respect to congestion avoidance than switch fabrics built for the purpose of providing connectivity between cards of a chassis based communication device. Standard networking technologies have generally been built with simple congestion avoidance mechanisms designed to scale to large numbers of devices rather than provide good performance with respect to loss rate and throughput. These technologies rely on higher layer protocols to recover from data loss. For example the congestion avoidance mechanism employed by Ethernet is the pause frame. When an Ethernet switch is experiencing congestion it may issue a pause frame to endpoints (data sources) that are thought to be the cause of the congestion. Upon the reception of a pause frame an endpoint is required to stop sending data for a period of time (indicated in the pause frame) to allow time for the congestion in the switch to be relieved. The endpoint is required to stop transmitting all data even if it has data destined for endpoints not affected by the congestion of the switch. This phenomenon is referred to as head of line blocking and it represents a loss of throughput in the switch. Purpose built switch fabrics avoid head of line blocking by implementing a system of virtual output queues (VOQs); these techniques are well known in the art. Typically the VOQs are contained within a switch fabric interface device or traffic manager contained on the each card in the system (excluding the switch cards). A discussion of virtual output queuing in context of implementing networking devices using buffered crossbar switches is included in Shang-Tse Chuang, Sundar Iyer, Nick McKeown; "Practical Algorithms for Performance Guarantees in Buffered Crossbars", Proceedings of IEEE INFOCOM 2005, Miami, Fla., March 2005, the contents of which are included by reference.

In a system employing virtual output queues each source of data into the switch implements a separate queue per destination endpoint; each of these queues can respond to backpressure independent of all the other queues. By this mechanism the switch fabric can assert backpressure only to the queues where the destination endpoint is congested; allowing data to continue to be transmitted to endpoints that are not currently experiencing congestion. The use of virtual output queues with backpressure (or flow control) eliminates the head of line blocking and increases throughput in the switch while limiting data loss in the switch due to congestion.

A high performance switch fabric can be constructed using standards based switching devices as a type of buffered crossbar element as they are known in the art. At each endpoint a simple distributed scheduling algorithm is implemented; backpressure (or flow control) using backward congestion notification techniques also know in the art are used to combat congestion in the crossbar element and at the destination endpoints. This invention implements hardware to interpret backward congestion notification frames reducing latency inherent to software only implementations; latency in the flow control feedback loop reduces the effectiveness of these techniques. The hardware methods described are designed to interoperate with a variety of devices such as network processors or traffic managers that are available in the marketplace; the ability to work with preexisting (building block) devices offers a great deal of design flexibility.

SUMMARY OF THE INVENTION

According to one aspect of the invention there is provided a communications apparatus comprising a plurality of functional modules for implementing an application; at least two switch modules to provide redundant switching capability for transferring frames between said functional modules; each said functional module being connected to each said switch module by a frame-based communication link; and a redundancy logic unit at each functional module for inserting sequence numbers into outgoing frames, replicating the outgoing frames for forwarding to each of said switch modules, and monitoring incoming frames from each of said switch modules to select frames for forwarding to the application based on the sequence numbers.

The present invention describes a method by which a switch fabric featuring congestion management and redundancy for a chassis based communication device can be constructed using standard networking devices that do not natively support advanced congestion management and redundancy as opposed to the proprietary switching devices that these systems are typically constructed from. The use of standard networking devices has many advantages from a system design point of view because they can interface with many existing components numerous vendors.

The invention permits the construction of a chassis based multi-card data communication device from commodity components while still offering advanced features provided by custom built systems; features such as congestion management and redundancy.

In order to reduce the effort required in the design of a chassis based data communications device, it is necessary to make greater use of standard silicon devices. One aspect of a chassis based communication device that could be served by the use of standard silicon devices is the switch fabric. The switch card is central to the design of the system and must interface with many other components; it is highly desirable to have a switch card that interfaces to other system components using a standards based interface. A standards based interface allows other system components to be implemented from pre-existing devices (be them silicon devices or pre-designed cards); increasing flexibility in the design of the system while reducing cost. The present invention is a method of employing Ethernet switching devices that are available from a number of sources to the implementation of a low cost switch fabric capable of interfacing with many pre-existing components for a data communication device. By utilizing the methods described in this invention it is possible to implement a low cost switching infrastructure with similar redundancy and congestion management features to purpose built switching devices.

The first aspect of the invention provides a method by which two Ethernet switch devices are combined to provide switch fabric redundancy. Logic on every transmitting endpoint is employed to replicate and sequence all traffic streams over redundant fabrics; complementary logic on the receiving endpoints is used to select the timeliest frame based on sequencing information added in the transmitting endpoint. By these methods a redundant switch fabric can be constructed that features near lossless recovery from all likely fault scenarios. The present invention employs a simple algorithm by which the first frame to arrive can easily be determined by the inclusion of a sequence number in each frame that can be used to determine if a copy of a particular frame has already been received.

In another aspect the invention provides a communications apparatus comprising a plurality of functional modules for implementing an application; a switch arrangement to provide switching capability for transferring frames between said functional modules; each said functional module being connected to said switch arrangement by a frame-based communication link; and each functional unit having a backpressure insertion unit for sending out backpressure notification frames through said switch arrangement when a congestion threshold is exceeded, and a backpressure extracting unit for monitoring incoming backpressure notification frames from a remote functional module to send a congestion signal to any traffic sources within said functional modules that are contributing to congestion at said remote functional unit.

The second aspect of the invention provides a method of advanced congestion management; whereby virtual output queues are maintained on each transmitting endpoint; any queuing point(s) between the transmitter and receiver that may become congested can generate a backward congestion notification (BCN) frame that will request that all transmitters to that queue pause or reduce their transmission rate. Logic in the transmitters will interpret the BCN frames and generate a backpressure signal to the VOQs that are the source of the congestion. By these methods it is possible to construct a switch fabric using Ethernet switching devices available from multiple sources that exhibits low loss characteristics while still maintaining high throughput.

BRIEF DESCRIPTION OF THE DRAWINGS

The invention will now be described in more detail by way of example with reference to the accompanying drawings in which.

DETAILED DESCRIPTION OF THE PREFERRED EMBODIMENTS

Figure 1:
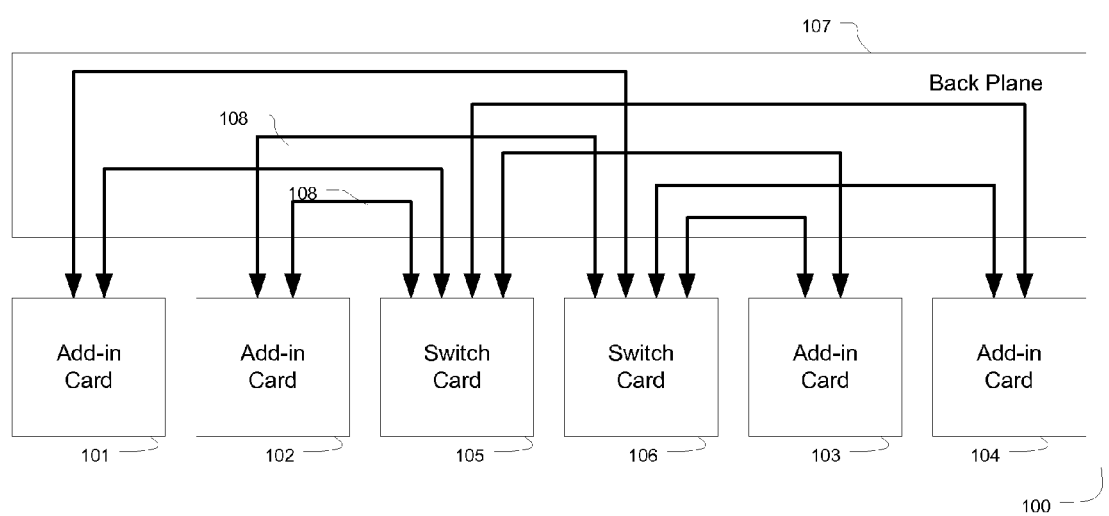
FIG. 1 shows the major components and critical interconnections of a data communication device.

FIG. 1 depicts a chassis based data communication device. The system consists of a series of modular components; the chassis 100, the backplane 107, add-in cards 101-104 and switch cards 105-106. More or less add-in cards 101-104 can be utilized without affecting the invention described. The chassis 100 is typically a metal enclosure suitable to be rack mounted in a data center or central office; it houses the backplane 107 and provides mechanical alignment, power, cooling and other basic services to the cards 101-106. The backplane 107 is a circuit card; different from other common circuit cards, it has very few (if any) active components. The primary components of the backplane 107 are connectors. The connectors are arranged in slots or banks; each slot would typically be used to house a single add-in card or switch card 101-106. The backplane 107 provides a series of communication links 108 between the slots. A communication link 108 typically consists of one or more electrical connections but optical variants are also possible; it may be unidirectional or bidirectional. The topology of these communication links 108 on the backplane 107 varies depending on the design of the system. A common topology that is deployed in many systems is commonly known as the dual star. In the dual star topology, there are two special slots 105-106 for redundancy on the backplane 107; these slots are known as switch slots. The switch slots have an independent communication link 108 to every other non-switch slot 101-104; in this topology, each switch card 105-106 forms the center of a star. The name dual star refers to the presence of two of these structures in the system; provided for redundancy. The material part of the present invention concerns methods used in the design of the switch 105-106 and other add-in cards 101-104 that make use of the dual star topology to provide redundancy and advanced congestion management; using standard local area networking devices to implement the switching cards.

Figure 2:
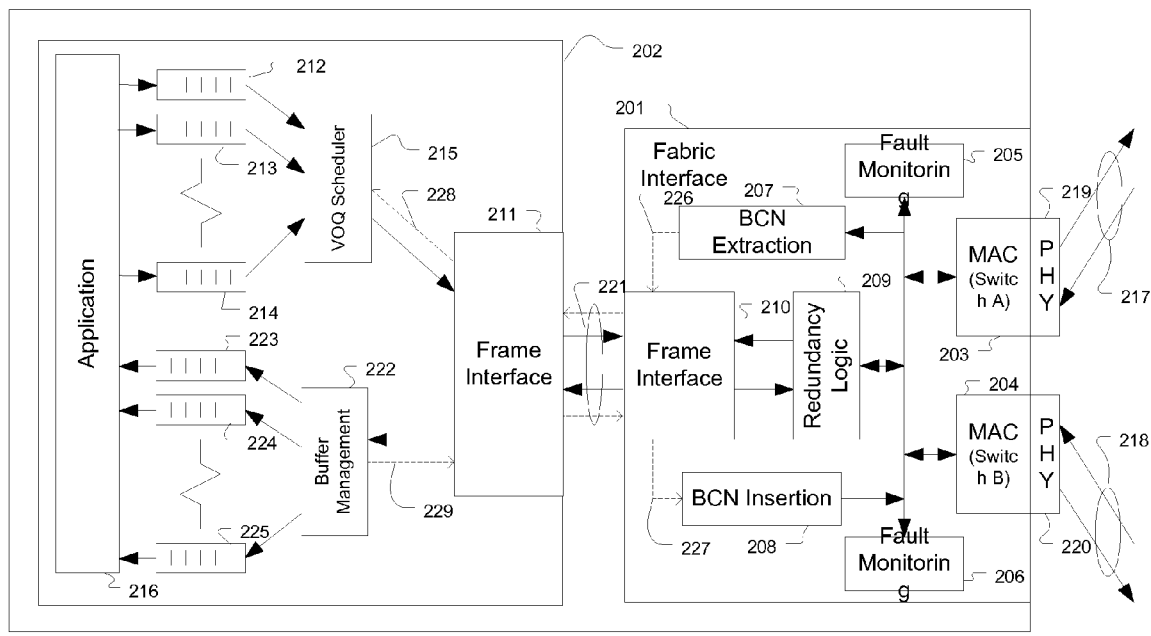
FIG. 2 shows a block diagram of the backplane interface components of an endpoint card capable of connecting to a switch implemented with standard networking silicon devices.

FIG. 2 represents a generic view of an add-in 101-104 card for the system depicted in FIG. 1. Chassis based communication devices typically have a number of different types of add-in cards (in addition to switch cards); these may include line cards, control cards etc. The present invention concerns how add-in cards 101-104 interface with the switch cards 105-106 and how the add-in cards 101-104 interface with each other. These functions are typically constant regardless of the overall function of the particular add-in card 101-104. Also worth noting is that a chassis based communication device also typically includes a significant amount of infrastructure for card to card management plane and control plane communications; these details have been omitted from the discussion because they are not directly relevant to the present invention and are well known in the art. The methods presented here could be applied to control and management plane communications using the same methods as for data plane communications described herein. Many systems, ATCA being one example have included separate Ethernet switches for the sole purpose of control and management plane communications between add-in cards 101-104.

The generic add-in card 200 of FIG. 2 is decomposed into two major blocks: the fabric interface 201 and the application complex 202. This decomposition represents one of many possible ways to partition the design; the functionality represented by the application complex 202 could be implemented in a traffic manager or network processor available from a number of sources, as well as in other types of processors or customized hardware devices; the functionality represented in 201 is often referred to as backplane or switch interface and could be implemented in a Field Programmable Gate Array (FPGA) or ASIC.

The switch interface 201 has a bidirectional communication link 217 and 218 between each of the switch cards 105-106 as described above. In the preferred embodiment of the invention, these links are 10 Gigabit Ethernet using a physical layer (PHY) 219-220 consisting of four electrical pairs for transmit and four electrical pairs for receive (for a total of 8 electrical pairs); this interface is defined by the IEEE in the 802.3 specification, herein included by reference and is commonly know in the art as Xaui. These communication links could optionally be implemented using a number of other possible electrical or optical PHY technologies at ten gigabits per second or at another bit rate; one gigabit per second for example. Ethernet standards are defined by the IEEE in the 802.3. It is also possible and within the scope of the present invention to implement the communication links 217-218 using other standard technologies such as Infiniband, RapidIO or Fibre Channel.

Each switch fabric communication link 217-218 is terminated by a media access controller (MAC) 203-204 as a part of the switch fabric interface 201. The MAC term is generally associated with the IEEE 802 family of protocols however; it is a generic term that can be applied to many communication protocols (in addition to those standardized by the IEEE). It is the function of the MAC layer to provide addressing and link access control mechanisms. In the present invention it is the purpose of the MACs 203-204 in the transmit direction (from the add-in cards 101-104 to the switch cards 105-106 of FIG. 1) to convert a stream of frames (collected from a number of sources to be described in subsequent sections) to a format understandable by the switching devices on the switch cards 105-106. In the receive direction (from the switch cards 105-106 to add-in cards 101-104 of FIG. 1) it is the MAC's function to extract frames from the bit stream provided by the link 217-218. The MACs 203-204 may be contained within an FPGA or ASIC or implemented as separate devices. It is critical to this embodiment that there are logically two MAC devices allowing data from both switch cards 105-106 to be terminated independently. The requirement for two MACs is driven by the frame selection logic (to be described in a subsequent section) when receiving frames from the switch card and by the requirement for independent monitoring of both switch cards to determine their health (described later).

Within the fabric interface 201 there are a number of frame sources and destinations 205-209; all of which send frames to the switch cards 105-106 (via the MACs 203-204), receive frames forwarded by the switch cards 105-106 (again via the MACs 203-204) or both send and receive frames. Each traffic source or destination 205-209 deals in different types or streams of frames for the purpose of providing some service to higher level functions of the overall system. The different types of frames or streams can be distinguished by MAC addresses, IP addresses, TCP ports or any other piece of information contained within the frame or underlying MAC protocol.

The fault monitoring logic 205-206 is included for the purpose of allowing the add-in cards 101-104 to be able to monitor their view of the health of each switch card 105-106 independently. A mechanism is required by which each communication link 217-218 between the switch cards 105-106 and the add-in cards 101-104 are monitored in each direction to determine overall system health. A preferred fault monitoring mechanism uses special fault monitoring frames that are periodically transmitted to the switch card where they are turned around and sent back on the same link; a state machine (also implemented in the fault monitoring logic 205-206) on the original transmitting card receives the frames. After transmitting a fault monitoring frame, the fault monitoring logic 205-206 will wait to receive it back; if this process times out and the frame is not received then the fault monitoring logic 205-206 can declare a link 217-218 to a particular switch card 105-106 to be in fault and notify higher level controlling entities.

The BCN extraction logic 207 is responsible for receiving and interpreting backward congestion notification (BCN) frames. A BCN frame is a generic term that is used to describe a mechanism by which a queue (anywhere in the system) can send a frame back to other devices or components in the system that are sending data to that queue and causing it to become congested. An example of a BCN mechanism is currently being standardized by the IEEE as 802.3ar, the contents of which are herein included by reference. Other non-standard BCN mechanisms have been implemented by Ethernet switch manufacturers as a protocol to run over inter-switch links in stackable switching products. The BCN extraction logic 207 receives BCN frames (in whatever format the switch and other system components generate them in) and processes them to determine if there are any flows in the queuing logic contained in the application complex 202 that are causing the congestion indicated in the BCN frame. A backpressure control signal 226 is generated by the BCN extraction logic to any queues 212-214 within the application complex 202 that are deemed to be causing congestion within the system. The BCN frame format can also be used to carry class of service (COS) aware congestion information. For example the BCN frame may indicate that a particular endpoint is too congested to receive low priority traffic. The BCN extraction logic 207 receiving this BCN frame would generate a backpressure signal 226 that would indicate to the queuing logic contained within the application complex 202 that it should stop sending low priority frames to the congested endpoint; meanwhile it is still possible to send high priority frames to the congested endpoint.

The BCN insertion logic 208 receives backpressure signals 227 from the application complex 202 via the frame interface 210 and based on these signals 227 generates BCN frames to be inserted into the MACs 203-204 and transmitted to the switch cards 105-106. The backpressure signals 227 from the application complex 202 could be used to indicate a COS or a particular endpoint or application. It is the function of the BCN insertion logic 208 to monitor backpressure signals 227 that it is receiving from the application complex 202 via the frame interface 210 and generate BCN frames targeted at other endpoints in the system. A BCN frame could be generated and sent to each source endpoint in the system that is causing a particular destination endpoint to become congested or a single BCN frame could be generated and sent to all source endpoints using the multicast capabilities of the switch cards 105-106.

The redundancy logic 209 works to ensure that the add-in cards 101-104 always have an open communication path to all of their peers via the switch cards 105-106. There are two aspects to the redundancy logic 209; one is for transmit frames (from the add-in cards 101-104 to the switch cards 105-106) and the other is for receive frames (from the switch fabric 105-106 to the add-in cards 101-104). In the transmit aspect the redundancy logic is responsible for accepting frames from the frame interface 210 and adding a sequence number to each frame; then replicating the frames after the sequence numbers have been inserted. Once the frames have been replicated the redundancy logic is responsible for inserting one copy into each MAC 203-204 to be sent to the switch cards 105-106. In the receive aspect the redundancy logic 209 receives two similar streams of frames (one from each MAC 203-204). It is the responsibility of the redundancy logic 209 to forward the earliest received frame from the two streams based on the sequence number; duplicate frames are removed from the stream that is forwarded to the frame interface 210.

The frame interface 210 is a piece of conversion logic between a generic frame based interface 221 supporting backpressure to multiple streams of frames and a bus suitable for implementation internal to an FPGA or ASIC that supports frame transmission and reception along with backpressure of individual streams. It provides an abstract interface between two logical groupings of functions contained in the application complex 202 and fabric interface 201; this is desirable in the case that these functions are implemented in separate devices. The type of frame interface implemented in 221 could be SPI4.2, Interlaken or other frame interface. The SPI4.2 interface is defined by the OIF; the Interlaken interface is defined by Cortina Systems; both specifications are herein included by reference. The interface between the frame interface 210 and the redundancy logic 209 is a bidirectional stream of frames. The interface 226 between the BCN extraction logic 207 and the frame interface 210 is an interface by which the BCN extraction logic 207 can easily assert backpressure to a particular VOQ 212-214 contained in the application complex 202. Between the frame interface 210 and the BCN insertion logic 208 is an interface 227 by which the application complex 202 can assert backpressure to a particular stream of frames from 201 to 202 (for example a particular COS) resulting in the generation of a BCN frame as described above.

The functions of the application complex 202 could be implemented in network processors or traffic managers available from a variety of vendors; optionally these features could be incorporated into an FPGA, ASIC or a combination of a number of devices that logically implement blocks contained within the application complex 202. The frame interface 211 provides a similar function for the application complex 202 as 210 provides for the fabric interface 201 in that it converts between the generic frame based interface 221 to a bus structure more suitable for implementation inside of an silicon device.

In the transmit direction (from an add-in card 101-104 to the switch cards 105-106) the most significant subsystem of the application complex 202 is the VOQ scheduler 215. It is the purpose of the VOQ scheduler 215 to determine from which queue 212-214 the next frame to be transmitted to the switch cards 105-106 will be taken from. The methods used by the VOQ scheduler 215 are not critical to the present invention and could involve any combination of the following; round robin, weighted round robin, deficit round robin, strict priority or any other queue scheduling algorithm. It is also possible to implement hierarchical algorithms in the VOQ scheduler logic 215; an example of one such instance where a hierarchical algorithm would be useful is where the virtual output queues 212-214 are organized as groups of queues each group for a different destination, the individual queues within the group representing different classes of service destined for the same destination. In an organization such as this a hierarchical scheduling algorithm could be implemented where by a weighted scheduler decides which destination to send to (selecting a group) and then from that group which individual queue to send from (the highest priority class of service for example). While there are many possible scheduling algorithms that could be used in the implementation of the VOQ scheduler, it is not critical which is used; however it is critical for the scheduling algorithm implemented in the VOQ scheduler 215 to respect any backpressure indications 228 given by the fabric interface 201 via the frame interfaces 210-211. The backpressure indications 228 received by the VOQ scheduler 215 is backpressure for a particular destination, for a particular class of service on a particular destination or a group of classes of services on a particular destination.

The function of the buffer management logic 222 is to admit frames based on availability of buffers and forward them to the application 216; it must also generate backpressure 229 towards the fabric interface 201 based on the availability of buffers to hold received frames. Frames that are admitted are placed in to per class of service queues 223-225 where they will be stored until the application 216 is ready to process them.

The application 216 represents the purpose of a particular add-in card and decides what the function of the card will be; this could be a line card, a control card or some higher layer processing function. The application will decide how frames will be allocated between the VOQs 212-214; determining their destination and class of service. In the receive direction (frames from the switch cards 105-106 to the add-in cards 101-104) the application accepts and processes frames from queues 223-225.

Figure 3:
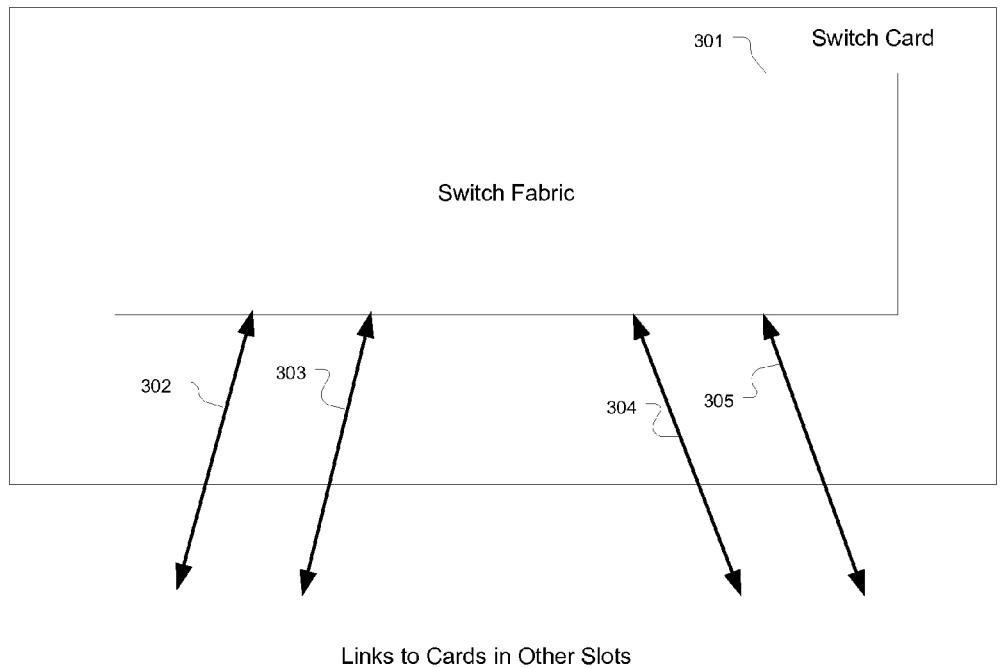
FIG. 3 shows a block diagram of a switch card implemented with standard networking silicon devices.

FIG. 3 shows a diagram of a switch cards 105-106. The switch card 300 is a special type of add-in card to the system; generally two switch cards 105-106 are included in a system for redundancy. The primary component of the switch card 300 is the switch fabric 301. The switch fabric is a device (or collection of devices) that aggregate the links 302-305 from all of the add-in cards 101-104 and logically connects them together. Frames transmitted from any of the add-in cards 101-104 will be forwarded to the correct link based on the destination MAC address contained within the frame. The device(s) that make up the switch fabric have in many existing designs been implemented with devices built specifically for this task. In the present invention the switch fabric is implemented using a standards based switching device designed for networking equipment; devices such as Ethernet switches, infiniband switches or other network switching device.

Figure 4:
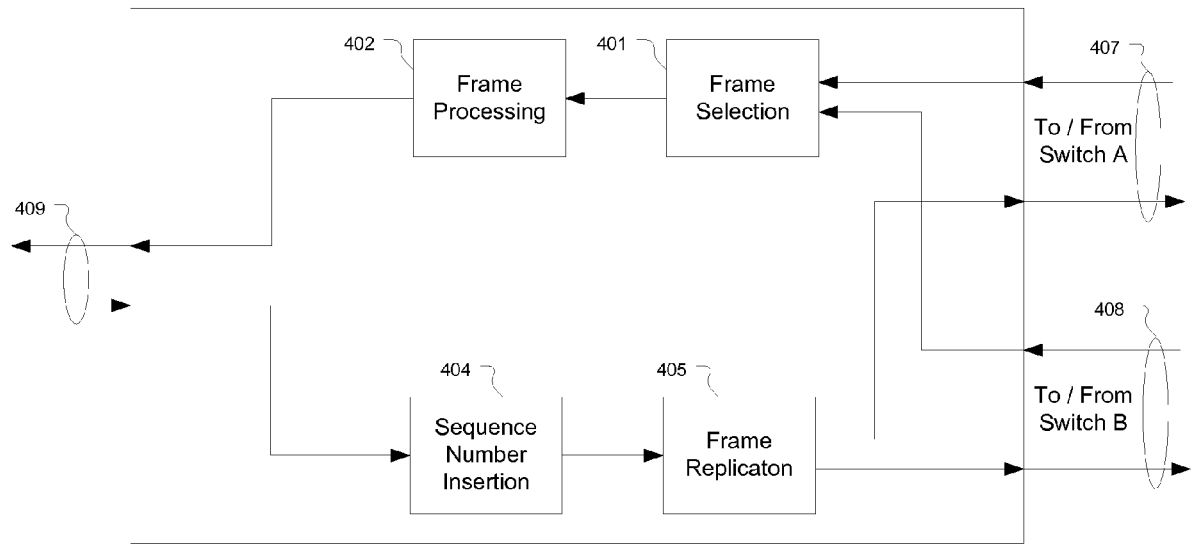
FIG. 4 shows a block level diagram of the card redundancy logic.

FIG. 4 shows a detailed view of the redundancy logic 209; it has individual interfaces 407 and 408 to each of the MACs 203-204 respectively and interface 409 to the frame interface 210. The frame selection logic 401 will receive frames from both MACs 203-204. Each frame will be inspected and the best frames from each fabric are selected to be forwarded; the best frame is determined by a sequence number contained within the frame.

The frame processing logic 402 will perform any header or frame formatting changes that are required to interoperate with upstream devices. For example if the application complex 202 is a network processor then it will be expecting frames to be in standard Ethernet formats; the frame processing logic will need to remove the sequence number of the frame which will preferentially be stored in the source MAC address during transit through the switch fabric 301. It is possible that there may be other header manipulations that are required to put the frames into formats that pre-existing software stacks will be already able to understand when the frame is received by the application complex 202.

In the transmit direction (from the add-in cards 101-104 to the switch cards 105-106) the redundancy logic 209 sequences the frames and then replicates them for transmission over both switch cards 105-106. The sequence number insertion logic 404 maintains a rolling sequence number for each destination in the system. For each frame received the sequence number insertion logic 404 will perform a lookup on the destination address; the result of the lookup will be the next sequence number to send to that particular destination. The sequence number will be preferentially inserted into a byte of the source MAC address before the frame is forwarded to the frame replication logic 405. The next sequence number for the destination must be incremented (rolling over to 1; 0 is reserved for unsequenced frames) and stored back to the array ready for the next frame.

The frame replication logic 405 will receive the sequenced frames from the sequence number insertion logic 404 and will replicate the frames and insert one copy into each of the stream of frames destined for each of the two switch fabrics 105-106.

Figure 5:
FIG. 5 show the format of the internal addressing used on an Ethernet switch fabric.
Figure 5:

FIG. 5 shows the format of the source MAC address 601 and the destination MAC address 600 used in the system. The switch fabric 301 will not be connected to any device outside of the system. This removes the requirement that all MAC addresses of devices connected to the switch 301 must be globally unique. A format for the internal MAC addresses is defined that encodes information about where the source and destination cards are physically located within the chassis; many other addressing schemes are possible. Using the internal addressing scheme, the switch fabric 301 must have its forwarding tables statically configured and source learning within the switch fabric 301 must be disabled; as such the source MAC address 601 is not used by the switch fabric 301. The source MAC address 601 can be used as a communication link between the sending and receiving endpoints in the system; used to carry frame sequence numbers required for redundancy. The source MAC address 601 is used to carry this information rather than adding an additional header to the frame as is done with protocols such as MPLS to save bandwidth, but other methods could be used within the scope of the invention. A frame sequence number 500 is scoped to a conversation between a pair of source and destination endpoints. The width (in bits) of the frame sequence number 500 controls the maximum number of unique frame sequence numbers before the sequence number is wrapped-around as described above; for example, a sequence number field 500 of 8-bits allows for 255 sequence numbers in the sequence number space (with zero being reserved as described above). The number of sequence numbers available should be greater than the number of frames which the fabric 301 can buffer for a given communication stream between a given pair of source and destination endpoints. This ensures that if switch card 105 and switch card 106 have different amounts of frames buffered (which can occur, for example, when a switch card 105 or 106 is inserted into a running system), there will not be a situation where the frame selection logic 104 will receive the same sequence number 500 for a given source destination pair from switch cards which refer to different source frames instead of the same frame as intended. The source endpoint is identified by the slot number 502 and the function 501 of the source MAC address. The destination endpoint is identified by the slot number 504 and function 503 or the destination MAC address 600. The function fields 501, 503 are used to distinguish between different types of frames; for example switch monitoring frames used by the add-in cards 101-104 to monitor the switch cards 105-106 could make use of the function fields 501, 503 to differentiate these flows from normal data traffic. In addition, the function fields 501, 503 could also be used to differentiate between different types of traffic to be processed by the application 216 if higher-level protocol fields such as found in and IP header and in UDP or TCP headers are not available in the frame. Fields 505 are unused fields that are preferentially set to zero on transmission and ignored upon receipt. Such fields can be used for future fields that need to be defined, or can be used to grow the size available for fields 500-504. The addressing scheme described in FIG. 5 also allows for an address 506-507 to be shared by two slots in the system for the propose of providing redundancy. In one possible scheme a bit in the function field 501-503 could be used to indicate that a particular address 506-507 is virtual. A virtual address can move to other slots in the system (other than the slot indicated in the slot field 502-504). In the case of a virtual slot address the slot number 506-507 would refer to the slot that is the primary slot for the particular function. In the case that the card in the primary slot fails then the forwarding tables in the switch fabric 301 can be reprogrammed to forward frames that are addressed to the primary card to a standby card that will assume the identity of the primary card that has failed. In this way virtual addressing can be used to assist in providing redundancy of cards in the system. Alternately the virtual addresses could be implemented by a higher layer protocol such as IP; in this case the MAC addresses 600-601 represent the physical slots and a protocol such as ARP is used to provide a mapping between the physical slots and the virtual entity.

Figure 6:
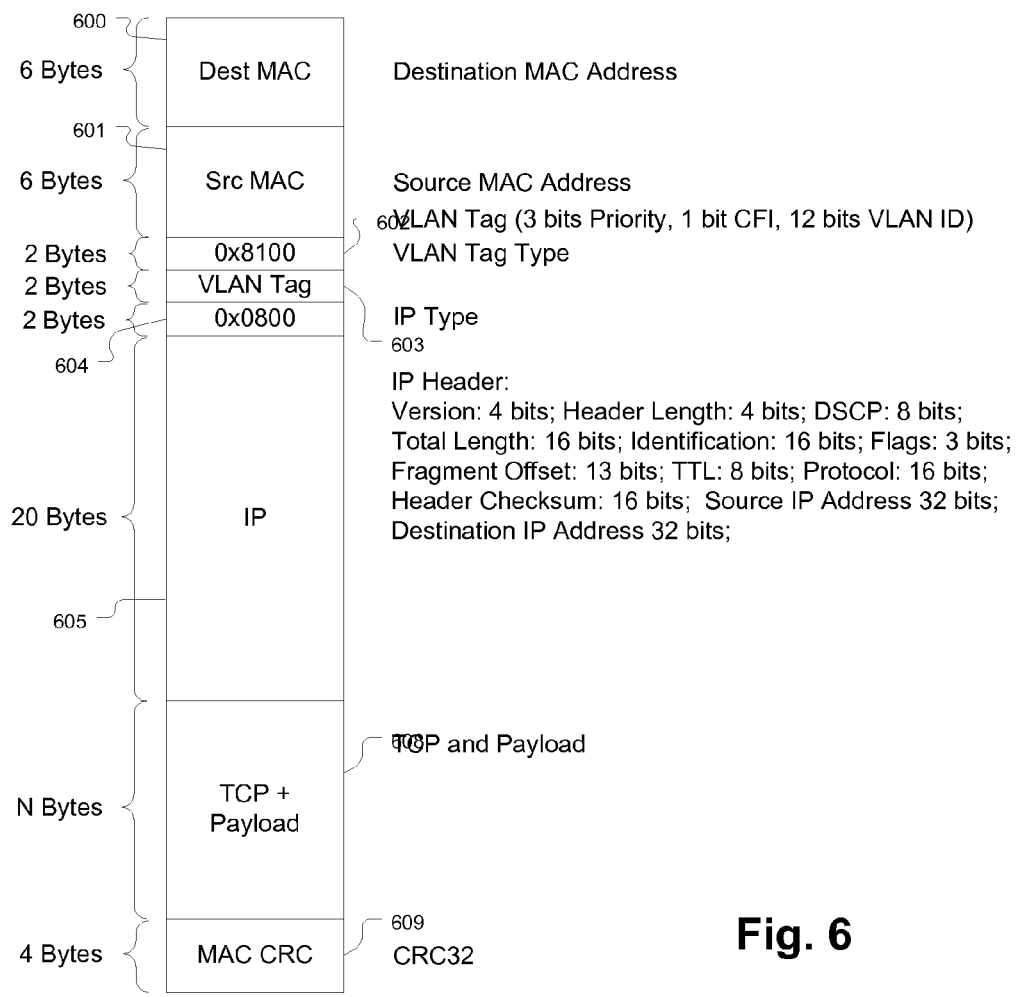
FIG. 6 shows the format of a frame carried over the backplane.

FIG. 6 is a description of the format of the frame 600 that will be used to transport data between the add-in cards 101-104. The destination MAC address 600 is the most critical field; the switch fabric 301 on the switch cards 105-106 will inspect this field and based on its contents make a decision as to which port 302-305 to forward a frame to. The source MAC address 601 is used by the redundancy logic to store the sequence number 500 of the frame and it also contains the slot number 502 of the add-in card 101-104 that generated the frame. The source slot number 502 is used to give scope to the sequence number 500. Each frame will contain a VLAN tag 603 (also known in the art as a Q-tag) containing a three bit priority field (p-bits), a single bit canonical form identifier (CFI) and a twelve bit VLAN identifier (VID). The frames will be priority tagged with the class of service marked in the p-bits and the VID set to zero; the CFI is unused. The switch fabric 301 will inspect the p-bits of the frame and provide Quality of Service (QOS). Frames that have a VLAN tag number have the VLAN tag ethertype 602 following the source MAC address 601. Following the VLAN tag 603 will be the ethertype value 604 for the payload of the frame; in many cases the payload will be an IP datagram (tag value 0x8000). Following the IP header 605 is the TCP header 608; this may not be significant depending on the application. In cases where the application 216 is not tolerant to frame loss; a higher level protocol such as TCP will be required to provide loss recovery. The entire frame is followed by a MAC CRC32 609; this provides error detection.

Figure 7:
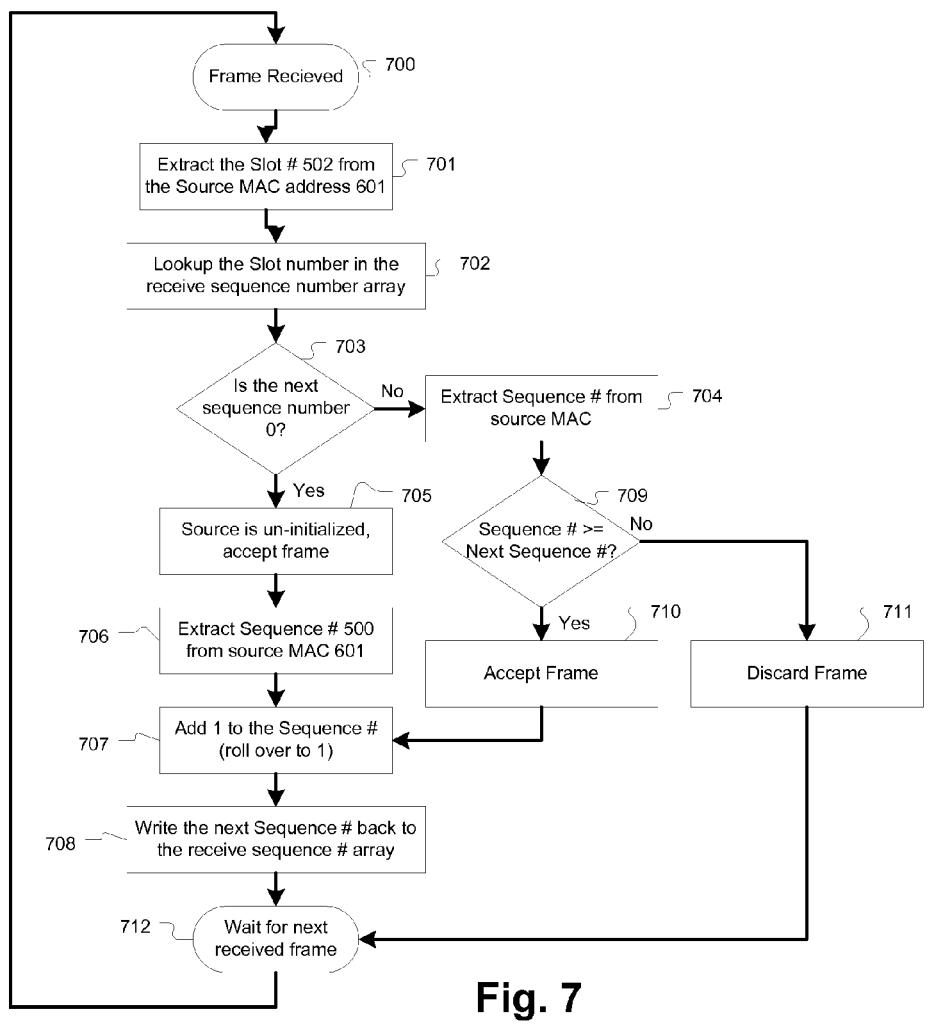
FIG. 7 shows details of the frame selection algorithm used by the card redundancy logic.

FIG. 7 is a description of the algorithm used by the frame selection logic 401. When a new frame 610 is received at step 700 (by either MAC 203-204) it must pass the frame selection logic 401 before it can be forwarded to the application complex 202. FIG. 7 describes the algorithm used to forward frames that have a sequence number 500 with a value other than zero. Frames received with a sequence number 500 containing a value of zero are unsequenced frames and will always be forwarded by the frame selection logic 401. Add-in cards 101-104 that contain a fabric interface 201 that is not capable of adding a sequence number 500 may send frames with a sequence number of zero. The slot number 502 is extracted from the source MAC address 601 in step 701. The slot number 502 is used as the address of a lookup into an array that contains the next expected sequence number for each source slot in step 702. The next sequence number is checked to see if it has a value of zero in step 703. If it does then step 705 is reached; this indicates that the next sequence number is un-initialized for this slot and that the frame should be accepted. Steps 706-708 describe a mechanism by which the next expected sequence number is initialized so that when the next frame is received the sequence number 500 can be checked before the frame is accepted. The sequence number 500 contained in the source MAC address 601 is extracted from the received frame in step 706 and incremented in step 707. The increment operation will roll the sequence number back to 1 if the maximum sequence number value is exceeded. The incremented value will become the next expected sequence number and is written back to the array in step 708. If the next expected sequence number in step 703 was not zero then the sequence number 500 is extracted from the frame in step 704 and is compared to the next expected sequence number in step 709. If the sequence number 500 is greater than or equal to the next expected sequence number then the frame is accepted in step 710 and the sequence number will be incremented to calculate the next expected sequence number in step 707 and stored in the array in step 708 as described above. If the sequence number 500 is less than the next expected sequence number then the frame will be discarded in step 711; this indicates that the frame was a duplicate received from the redundant switch card. Control then reaches step 712 where the frame selection logic 401 waits for the next received frame, and then processing starts over for the new frame at step 700.

The sequence numbers 500 are used to aid in the restoration of service after a failure. Without the sequence numbers 500 in the case of a failure of one of the switch cards 105-106 a controller function located in the system would be required to tell all of the receiving endpoints in the system to start receiving frames from the standby switch card 105-106; the controller function would also be required to tell all of the transmitting end points to send traffic to the standby switch card 105-106. Without the sequence numbers 500 service restoration after the failure of a switch card would be slower by an order of magnitude. With a more complicated algorithm than the one described in FIG. 7 the sequence numbers 500 could be used to recover from frames lost in the switch card 105-106. Algorithms capable of recovering from the loss of a frame in the switch fabric involve detecting gaps in the sequence numbers 500 of the frames received and buffering frames for a period of time until the missing frames are received from the redundant switch card 105-106.

Figure 8:
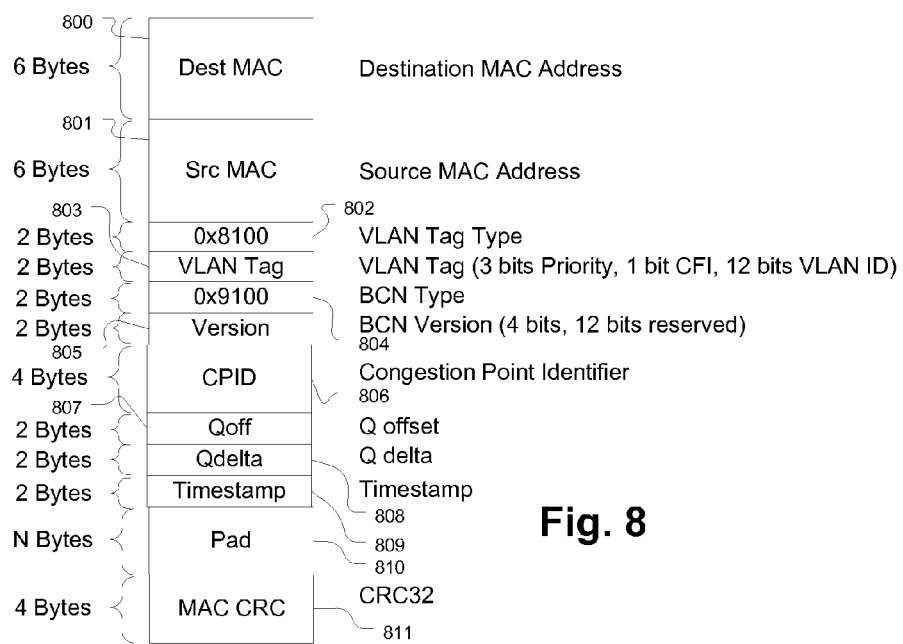
FIG. 8 shows the format of the BCN frames.

FIG. 8 is a description of the format of the BCN frames 812 used to carry information about congestion of various system resources. The BCN frame 812 carries information back to the sources of congestion so that they can modify their behavior to relieve the congestion. The format of the frame 812 is similar to that of FIG. 6 except that its payload will not be an IP datagram. The format shown is based on a pre-standard version of the frame format being generated as a part of the IEEE 802.3ar specification currently under development; the details of the frame format are not critical to the present invention and can be modified to comply to the standard versions once the standard is complete or alternately they could be modified to comply to one of the nonstandard frame formats that currently exist in the marketplace. The destination MAC address 800 is used by the switch fabric 301 to direct a frame to its intended destination endpoint. In the case of a BCN frame 812 generated by an add-in card 101-104 the destination MAC address 800 will be the broadcast MAC address (FF:FF:FF:FF:FF:FF). The broadcast MAC address is used so that the BCN frame 812 will be forwarded to all possible sources. In the case of a BCN frame 812 generated by the switch fabric 301 to indicate that a particular resource within the switch fabric 301 is becoming congested, the destination MAC address will be the source MAC address from a sample of the frames causing the congestion; these frames will be switched back to the source endpoints. The source MAC address 801 will be the MAC address of the entity that is congesting; this could be one of the add-in cards 101-104 or the switch card 105-106. The BCN frames 812 contain a VLAN tag 803 and the VLAN tag type 802 as with the frame format described in FIG. 6; this will allow the BCN frames 812 to have the p-bits of the VLAN tag set to adjust the COS of the frame. The VLAN tag 803 will be followed by a special ethertype value 804 to indicate that this frame is a BCN frame 812; the BCN specific fields will follow the BCN ethertype field 804. The BCN frame content starts with a four bit version 805; this field is padded out to a sixteen bit boundary with a twelve bit reserved field. The version 805 will offer flexibility to track changes to the protocol in the future. The Congestion Point Identifier (CPID) 806 follows the version field 805; it is an identifier assigned at system startup to each possible congestion point in the system. The CPID 806 allows any source of data within the system to determine based on the BCN frames 812 it receives which resources are congested so that the data sources can act to relieve the congestion. The Queue Offset (Qoff) field 807 is the difference between the length of the queue and the queue equilibrium threshold. This gives a measure of how congested the queue is. The Queue Delta (Qdelta) field 808 is the difference between the current queue fill level and the queue fill level at the time of the previous measurement. This is an estimation of the rate at which the queue is filling and can be used to determine how drastic an action must be taken to relieve the congestion. The timestamp field 809 is not used; it appears in the draft 802.3ar spec so space is reserved. A pad field 810 is optionally included to make sure that the frame respects any minimum frame length requirements. The frame check sequence 811 is included to provide error detection.

The operation of the fabric interface 201 and its use in conjunction with switch cards 105-106 to provide redundant communication between add-in cards 101-104 is now described. When the application 216 (residing on an add-in card 101-104) makes a decision to send data to an application 216 residing on a different add-in card 101-104 it must, possibly with the help of a networking stack, generate a frame 610 to be transmitted to the destination add-in card 101-104 via the switch cards 105-106. The frames 610 generated by the application 216 will carry MAC addresses as described in FIG. 5; the sequence number 500 will not be present in the source MAC address (it will be added by the fabric interface 201). The frames 610 must also carry a VLAN tag 603 with the p-bits set (priority tagged). The p-bits are used by the switch fabric 301 to determine the COS that a particular frame should receive. The application will place the frame in the appropriate VOQ 212-214 for that particular destination and COS. The VOQ scheduler 215 will decide when to transmit the frame to the fabric interface 201.

The redundancy logic 209 will receive frames from the application complex 202 via the frame interface logic 210-211. Before the frames can be transmitted to the switch cards 105-106 the redundancy logic must process the frame; adding in the sequence number to be acted upon by the destination and replicating the frames for transmission over both switch cards 105-106.

The redundancy logic 209 will receive the stream of frames from the application complex 202 and begin processing them by sequencing the frames in the sequence number insertion logic 404. The destination slot number 504 is extracted from the destination MAC address and is used as the index for a lookup into an array containing the next sequence number for the destination slot. Sequence numbers are scoped to a particular source and destination pair; put another way, two sequence numbers are only comparable if they are between the same two endpoints as determined by the slot numbers 502 and 504 contained in the source and destination MAC addresses 506 and 507 respectively. The sequence number obtained from the lookup will be the next sequence number to be added to the sequence number field 500 of the source MAC address 506. The sequence number (that resulted from the lookup) is incremented and written back into the array.

The sequenced frames received from the sequence number insertion logic 404 are passed on to the frame replication logic where two copies will be generated. One copy will be sent to each of the two MACs 203-204 contained within the fabric interface 201 for transmission to the switch cards 105-106 where they will be forwarded to the destination add-in card 101-104.

Frames received by the switch cards 105-106 will be inspected by the switch fabric 301. The devices used to implement the switch fabric are based on standards defined by the IEEE and other standards bodies; as such the features of these devices can be discussed generically without referencing specific implementations. The destination MAC address of the frames will be inspected by the switch fabric 301 and the frames will be forwarded to the correct link for the destination add-in card 101-104 based on the destination MAC address. The switch fabric 301 will determine the correct link to forward the frames on based on statically configured forwarding tables. Source address learning as described in IEEE 802.1 herein incorporated by reference will be disabled because of the sequence numbers that are stored in source MAC address 500 will cause the switch fabric 301 to learn a lot of nonexistent addresses; causing other unwanted switch behaviors such as flooding of packets with unknown addresses to all ports. Within the scope of the present invention source learning serves little purpose since the MAC addresses used within the system are assigned based on slot position within the chassis. In cases where it is useful to have a MAC address move from slot to slot (like in the case of add-in card redundancy) a special class of virtual MAC addresses could be generated that are shared between two endpoints for the purpose of endpoint redundancy. The switch fabric 301 will also inspect the priority contained within the p-bits and queue frames differentially based on the contents of this field; providing quality of service (QOS) as it is known in the art.

At the destination add-in card 101-104 two copies of each frame 610 are received (assuming that neither switch card was experiencing congestion and that both are functioning correctly). Any frames 610 that contain an error as detected by a failure of the CRC32 609 check performed by the MACs 203-204 will be discarded; frames passing the CRC check will be forwarded to the redundancy logic. Any copies of a particular frame 610 are received by the redundancy logic 209 in serial fashion. The first copy of a particular frame 610 (as identified by the source MAC address 601, destination MAC address 600 and sequence number 500) will be accepted by the redundancy logic 209 and forwarded on to the application complex 202. The algorithm used by the frame selection logic 401 to determine which frames to accept and which frames to discard is described by the flow chart in FIG. 7. Frames accepted by the frame selection logic and forwarded will have the sequence number 500 removed (changed to zeros) by the frame processing logic 402; to eliminate any interactions with preexisting software stacks that may be used in the application 216 that are not sequence number aware.

Once accepted by the redundancy logic 209 frames are forwarded via the frame interface 210-211 to the buffer management logic 222; where a decision whether or not to discard the frame will be made based on the class of service marked within the frame and the state of the application 216. At this point redundancy of the switching infrastructure of the chassis based communication device has been achieved. Applications 216 residing on any two add-in cards 101-104 that wish to communicate with each other will be able to receive a single copy of a steam of frames between them under any single failure of the switch cards 105-106 or the backplane 107. It can be seen how the sequence numbering of frames combined with the methods described above can provide redundancy with virtually zero frame loss.

The systems previously described are resilient to a failure of any component between the MACs 203-204 on the source and destination add-in cards 101-104 as will be demonstrated by the following examples. The first example is a failure of either MAC 203-204 on the source (or transmitting) add-in card 101-104 or the failure of one of the transmit links to the switch card 105-106; hardware replication of every frame and transmission over duplicate (and diverse) paths will ensure that at least one copy of the message will be received at the destination add-in card 101-104. The redundant path (unaffected by the failure) will see that a copy of the frame is sent to the destination add-in card 101-105 via the switch card 105-106 that is unaffected by the failure. In this case the sequence numbers contained in the frame will allow redundancy logic 209 on the destination add-in card 101-104 to independently decide which switch card to receive from and the frame selection logic 401 is sophisticated enough that it can decide which frames to forward on a frame by frame basis using the algorithm described in FIG. 7; allowing a hitless recovery in most cases. Critical to providing a hitless recovery is the presence of the sequence number 500; this allows the destination add-in cards 101-104 to act independently (without the intervention of a controller) to restore service. No information about the nature of the failure is required by the destination add-in cards 101-104.

A second example is a failure of a switch card 105-106 or a failure of one of the receive links between the switch card 105-106 and the destination add-in card 101-104. The recovery mechanism in this case is similar to the first example in that recovery from the failure is dependant on the redundancy logic 209 and the frame selection logic 401 on the destination add-in card 101-104. The recovery from a failure of a switch card 105-106 will again be hitless in most cases because the recovery requires no intervention from a controlling function contained on another card in the system. This is a unique feature of the system enabled by the use of sequence numbers to determine which frames to forward and how to filter off duplicate frames.

As a final part of the redundancy feature of the system, the add-in cards 101-104 will monitor their connection to each switch card 105-106 independently this is so that failures can be detected an reported to the control application. The mechanism employed is as follows; there are two fault monitoring blocks 205-206, one for each switch card. Each fault monitoring block 205-206 will periodically generate a special fault monitoring frame; it will have source and destination MAC addresses the same. The function field of the MAC addresses 501 and 503 will be set differently from other data traffic so that the fault monitoring frames can be separated from other traffic. The fault monitoring frames are not sequenced and do not pass through the redundancy logic, they will only be transmitted to a single switch card 105-106. The switch cards 105-106 have the forwarding tables of their switch fabrics 301 configured to forward the special MAC addresses used for fault monitoring back to the port that they were received on. Using these mechanisms the fault monitoring block 205-206 on every add-in card 101-104 can monitor the health of both switch cards 105-106 by periodically injecting special frames to both switch cards 105-106 and waiting for them to be returned; if they are not returned within a predetermined time period then the path being tested is reported to the controlling application as being in fault. A controlling function within the system will notify all add-in cards 101-106 in the system of a failure detected by any of the cards; it may also choose to take one or more add-in cards out of service in reaction to the detection of a failure to prevent the effects of the failure from affecting other add-in cards that are otherwise functioning normally. There maybe add-in cards in the system that do not have the fabric interface logic 201 that need to be configured to listen to one switch card or the other that will need notification of a failure to restore service. Cards that do implement the fabric interface logic 201 need not be notified of the failure as they will select the correct frames over the first fabric interface to deliver them.

The system components as described above work together to provide advanced congestion management system wide as follows. In the system of FIG. 1, data flows from a source add-in card 101-104 to a destination add-in card 101-104; backpressure or flow control information travels from the destination add-in card 101-104 to the source add-in card 101-104. Under normal conditions there would be no congestion in the system; the destination add-in cards 101-104 and the switch fabric 301 would not be generating any BCN frames 812. The function of the system under congestion will be described by way of the following two examples; the first example will be of a system where a destination add-in card 101-104 becomes congested and the second will be of a system where the switch fabric 301 becomes congested.

Add-in cards 101-104 behave as data sources and destinations; as a source the application 216 contained within the add-in card 101-104 will generate frames of data 610. These frames 610 will contain a VLAN tag 603 with the p-bits set appropriately depending on the QOS requirements of the frame. The frames 610 will be placed by the application 216 into one of the VOQs 212-214; there will be one VOQ assigned to each unique combination of COS and destination. Optionally more than one COS can be placed in a single queue 212-214 to save queues at the cost of reduced QOS performance. The VOQ scheduler 215 can make use of any scheduling algorithm (that meets system performance requirements) to determine when a particular frame will be sent to the fabric interface 201. The redundancy logic 209 will add sequence numbers and replicate the frame such that one copy is transmitted to each MAC 203-204 and each switch card 105-106. The switch card will deliver the frames 610 to the destination add-in card 101-104 based on the destination MAC address 600 contained within the frame 610; the switch card will also inspect the p-bits of the VLAN tag 603 to determine the priority with which the frame should be forwarded with respect to other frames to be transmitted to the same destination. The frames 610 will be received by the destination add-in card 101-104; one frame from each MAC 203-204. The redundancy logic will select one of the frames based on the algorithm described in FIG. 7. A copy of the frame 610 is transferred to the application complex 202 from the redundancy logic 209 in the fabric interface 201. The buffer management logic 222 inspects the frame (including the p-bits of the VLAN tag 603) to determine the action to take. There are three possible actions; the buffer management logic 222 could accept the frame, the buffer management 222 logic could discard the frame or the frame could be accepted but a backpressure signal 229 is raised to indicate that the application 216 is becoming congested. In the preferred embodiment the buffer management logic 222 maintains a series of thresholds based on the number of available buffers; as the thresholds are crossed the buffer management logic 222 will begin to signal backpressure 229 for the low priority COS. If the congestion intensifies the buffer management 222 will begin to signal backpressure 229 for high and low priority COS and possibly begin to discard frames with low priority COS. If the source endpoints react quickly enough to the backpressure signals generated by the buffer management logic 222 then no frames will need to be discarded; this is the design intent and will be a feature of a well designed system. There are many buffer management algorithms in addition to the one just described that could be employed; for example, the lengths of the application queues 223-225 could be monitored and thresholds based on the length of the queues could be used to signal backpressure. In general the buffer management logic 222 monitors parameters and takes action when thresholds based on these parameters are crossed. The crossing of a threshold will trigger the generation of a HW backpressure signal 229 for a particular COS. The backpressure signal will be relayed to the fabric interface 201 via the frame interface logic 210-211; ultimately to be received by the BCN insertion logic 208 via backpressure signal 227. Upon the reception of a backpressure signal 227, the BCN insertion logic 208 will determine based on the type of backpressure signal the type of BCN frame to generate. For example if the frame interface 221 was implemented using SPI4.2 then the backpressure signal would be received by the fabric interface 201 as a satisfied indication on a particular SPI logical port. The SPI logical ports would be used to indicate different classes of service (rather than different physical ports as is the typical use for SPI4.2). Based on the COS of the SPI logical port that the backpressure indication is received on; a BCN frame targeting that particular COS can be created by the BCN insertion logic 208. The BCN frame 812 must be sent to all traffic sources as such it will have its destination MAC address 800 set to be the broadcast MAC address (FF:FF:FF:FF:FF:FF). The BCN frame 812 will have the same source MAC address 801 as a data frame but will not have the sequence number 500 added (sequence number will be zero). The VLAN tag 803 will be present and the p-bits will indicate which COS the BCN frame applies to. The CPID 806 will indicate the slot or source that originated the frame. Alternately the BCN frames generated could have the p-bits set to the highest priority and the CPID 806 could be used to encode the slot and COS that originated the frame; this would improve the overall function of the end to end congestion management function by reducing latency because switching silicon often queues high priority frames preferentially. The Qoff value 807 will be set to a pre-configured value for the particular backpressure signal received. The Qdelta 808 will be set to zero as will the timestamp 809. The pad field 810 will be 30 bytes and the MAC CRC 811 will be calculated and added to the frame by the BCN insertion logic 208. The generated BCN frames 812 are not sequenced (since they go to a broadcast address they cannot be sequenced by the same mechanism as normal data frames) and a copy will be inserted directly in to the stream of frames towards each switch card 105-106 at the MACs 203-204.

The BCN frames 812 received by the switch cards 105-106 will be forwarded to all other ports 302-305 of the switch fabric 301 (because the destination MAC address 800 is the broadcast MAC address). The BCN frames 812 are received by all endpoint add-in cards 101-104 in the system (in this case they represent the possible sources of traffic to the congesting destination). BCN extraction logic 207 will receive both BCN frames (the second one received will simply overwrite the first since their effect will be the same). The COS (from the p-bits of the VLAN tag 803) and the CPID 806 will be extracted from the BCN frame 812; from this information the BCN extraction logic 207 can generate a HW backpressure signal 226 forwarded by the frame interface 210-211 that will directly backpressure the traffic sources that are causing congestion on the remote add-in card 101-104. For example if 221 is implemented using SPI4.2 then a satisfied indication will be sent (from the fabric interface 201 to the application complex 202) to a SPI logical port identifier that corresponds to the source slot and COS of the BCN frame. The SPI logical ports in this case represent a combination of (destination add-in cards 101-104 and a class of service). Based on the value of Qoff 807 contained within the BCN frame the BCN extraction logic 207 will apply the backpressure signal for a period of time to allow for the congestion of the destination to dissipate. In the preferred embodiment the BCN extraction logic 207 will assert backpressure for a random amount of time between 0 and (Qoff*8)/speed of the backplane link 217-218. In this case the backpressure will automatically be removed after a period of time avoiding the issue of having backpressure stuck on if a BCN frame with an Xon indication was dropped by a congested switch card 105-106.

The second example involves congestion of the switch fabric 301; this case is similar to the first example except that in this case the switch fabric 301 will generate the BCN frame 812. As in the first example an application 216 residing on a particular add-in card 101-104 generates a frame of data 610 destined for another add-in card 101-104 in the system. The frame 610 is placed by the application 216 into the correct VOQ 212-214 based on the destination and COS of the frame. The VOQ scheduler 215 will eventually schedule the frame 610 for transmission and send it via the frame interface 210-211 to the fabric interface 210. The frame will be sequenced and replicated by the redundancy logic 209 before it is sent to the switch cards 105-106 via the MACs 203-204. The switch fabric 301 on the switch card 105-106 will attempt to forward the frame 610 to the destination add-in card 101-104 based on the destination MAC address 600 contained within the frame taking into account the COS of the frame based on the p-bits of the VLAN tag 603. If the switch fabric 301 detects that this frame 610 has caused one of its resources (buffer availability or queue length for a particular destination port) to become congested then it can generate a BCN frame 812 of its own. In this case the BCN frame 812 will take its destination MAC address 800 from the source MAC address 601 of the frame 610 that caused the congestion. The p-bits of the VLAN tag 803 contained in the BCN frame 812 will be copied from the p-bits of the VLAN tag 603 of the frame 610 causing the congestion. The CPID 806 will contain an identifier for the queue or resource that is being congested; this could be for example the source and destination ports as well as the COS. The Qoff field 807 will indicate by how much the congested queue is over its normal equilibrium length. The Qdelta 808 is the difference between the current queue length and the queue length at last sample; this is to show if the queue length is growing or shrinking and can be used by the BCN extraction logic of frame sources (depending on their complexity) to decide how aggressively to backpressure a particular source. The timestamp 809 will not be populated (set to zero). The switch fabric 301 may choose to only generate BCN frames 812 for a sampling of the frames causing congestion (rather than for every frame) to avoid causing further congestion based on all of the extra traffic. The BCN frames 812 generated by the switch will get sent to all ports; the destination MAC address (taken from the source of the original frame causing the congestion) will not be programmed into the forwarding tables of the switch fabric 301 because of the sequence number 500 inserted by the redundancy logic 209. BCN frames 812 received by an add-in card 101-104 will be received by the BCN extraction logic 207. The BCN extraction logic 207 will inspect the destination MAC address 800 (specifically the destination slot number 504) to see if this frame 812 was intended for this slot. If the frame passes the destination MAC address check by the BCN extraction logic 207 then, the p-bits from the VLAN tag 803 and the CPID 806 will be extracted; from these fields the BCN extraction logic 207 can determine which VOQ(s) 212-214 to backpressure. Note that several VOQs may need to be backpressured since several end destinations may be reachable via the same (congested) switch port. Next the Qoff 807 and Qdelta 808 fields will be extracted and used to determine for how long backpressure should be applied for. A mechanism similar to the one described in the previous example is employed by which a satisfied indication is sent to a SPI logical port or series of SPI logical ports (if 221 is implemented using SPI4.2) based on the CPID 806 and the p-bits of the BCN frame. The satisfied indication will be signaled for a random amount of time based on the value of Qoff 807 received in the BCN frame.

It will be appreciated that an exemplary embodiment of the invention has been described, and persons skilled in the art will appreciate that many variants are possible within the scope of the invention.

All references mentioned above are herein incorporated by reference

We claim:

1. A communications apparatus comprising:
   a plurality of functional modules for implementing an application capable of behaving as both a source and destination;
   at least two switch modules to provide redundant switching capability for transferring frames between any pair of said functional modules;
   each said functional module being connected to each said switch module by a frame-based communication link; and
   a redundancy logic unit at each functional module for inserting sequence numbers into outgoing frames, replicating the outgoing frames for forwarding to each of said switch modules, and monitoring incoming frames from each of said switch modules to select frames for forwarding to the application based on the sequence numbers in the incoming frames, and
   wherein said redundancy logic at each functional module is further configured to:
   (i) maintain a first plurality of rolling sequence numbers, one for each destination functional module, whereby the rolling sequence number for a particular destination functional module increments when a frame is sent to that destination functional module;
   (ii) maintain a second plurality of rolling sequence numbers, one for each source functional module, whereby the rolling sequence number for a particular source functional module is incremented when a non-duplicate frame is received from that source functional module;
   (iii) upon receipt of a frame for transmission to a particular destination functional module, perform a lookup for that particular destination functional module to determine the next sequence number to be inserted in a frame forwarded to that particular functional module; and
   (iv) upon receipt of an incoming frame, identify the source functional module for the incoming frame, extract the sequence number from the incoming frame, perform a lookup for that particular source functional module to identify the next expected sequence number; and discard the frame if sequence number extracted from that incoming frame is less than the next expected sequence number for that incoming frame.

2. The communications apparatus of claim 1, wherein the functional modules are identified by a slot number inserted in a field of said frames.

3. The communications apparatus of claim 1, wherein said frame-based communication links are selected from the group consisting of: Ethernet, and Infiniband.

4. The communications apparatus of claim 1, further comprising a backplane providing said communications links and slots for receiving said modules.

5. The communications apparatus of claim 4, wherein said modules comprise plug-in cards.

6. The communications apparatus of claim 5, wherein said backplane is mounted within a chassis.

7. The communications apparatus of claim 1, wherein said functional modules include a backpressure insertion unit for inserting unsequenced backpressure notification frames into outgoing frames in response congestion within said functional modules, and a backpressure extraction unit for extracting backpressure notification frames from incoming frames received from the switch units, said backpressure extraction unit sending a congestion signal to said application to instruct traffic sources contributing to said congestion to relieve pressure.

8. The communications apparatus of claim 7, wherein said switch modules include a backpressure insertion unit for inserting backpressure notification frames into outgoing frames.

9. The communications apparatus of claim 8, wherein the application stores outgoing frames in queues, a scheduler forwards the frames in accordance with a scheduling algorithm, and said congestion signal is sent to said scheduler to control the transmission of said outgoing frames.

10. The communications apparatus of claim 8, wherein said backpressure insertion unit is responsive to a signal from a buffer management unit to send out backpressure notification frames to other functional modules when a congestion threshold is exceeded.

11. The communications apparatus of claim 10, wherein said backpressure notification frames are broadcast to all the functional modules.

12. The communications apparatus of claim 8, wherein said backpressure notification frames contain class-of-service aware information.

13. The communications apparatus of claim 7, wherein backpressure notification frames contain a zero in a sequence number field.

14. The communications apparatus of claim 1, wherein each communications link terminates at the functional modules in a media access controller, and the redundancy logic unit forwards frames to, and receives frames from, each media access controller.

15. The communications apparatus of claim 1, wherein said application is implemented in an application complex, said redundancy logic is implemented in a fabric interface, and said fabric interface communicates with said application complex through a pair of communicating frame interfaces.

16. A method of controlling a communications apparatus comprising a plurality of functional modules for implementing an application capable of behaving as both a source and destination; at least two switch modules to provide redundant switching capability for transferring frames between any pair of said functional modules; each said functional module being connected to each said switch module by a frame-based communication link; said method comprising:

- maintaining at each functional module a first plurality of rolling sequence numbers, one for each destination functional module, whereby the rolling sequence number for a particular destination functional module increments when a frame is sent to that destination functional module;
- maintaining at each functional module a second plurality of rolling sequence numbers, one for each source functional module, whereby the rolling sequence number for a particular source functional module is incremented when a non-duplicate frame is received from that source functional module;
- upon receipt of an outgoing frame at a source functional module for transmission to a particular destination functional module, performing a lookup for that particular destination functional module to determine the next sequence number to be inserted in a frame forwarded to that particular functional module;
- inserting the next sequence numbers determined by said lookup into that outgoing frame;
- replicating that outgoing frame for forwarding to each of said switch modules;
- upon receipt of an incoming frame at a destination functional module, identifying the source functional module for the incoming frame, performing a lookup for that particular source functional module to identify the next expected sequence number for that particular source module, extracting the sequence number from the incoming frame, and discarding the frame if sequence number extracted from that incoming frame is less than the expected sequence number for that incoming frame.

17. The method of claim 16, further comprising broadcasting unsequenced backpressure notification frames to all said functional modules when congestion occurs to instruct sending modules to reduce outgoing traffic.

18. The method of claim 17, wherein receiving functional modules monitor incoming frames for backpressure notification frames, and in response to the receipt of such frames send a congestion signal to outgoing traffic source to reduce outgoing traffic.

19. The method of claim 18, wherein backpressure notification frames contain a distinct congestion point identifier.

20. The method of claim 18, wherein the application stores outgoing frames in queues, a scheduler forwards the frames in accordance with a scheduling algorithm, and said congestion signal is sent to said scheduler to control the transmission of said outgoing frames.

21. The method of claim 17, wherein said backpressure insertion unit is responsive to a signal from a buffer management unit to send out backpressure notification frames to other functional modules when a congestion threshold is exceeded.

22. The method of claim 17, wherein said backpressure notification frames contain class-of-service aware information.

* * * * *